US007995998B2

(12) United States Patent
Wright et al.

(10) Patent No.: US 7,995,998 B2
(45) Date of Patent: Aug. 9, 2011

(54) WIRELESS DEVICE WITH INTEGRATED EMERGENCY ALERT NOTIFICATION

(75) Inventors: Darrick Wright, Cullman, AL (US); Paul Brent Rivers, Cullman, AL (US)

(73) Assignee: AT&T Delaware Intellectual Property, Inc., Reno, NV (US)

( * ) Notice: Subject to any disclaimer, the term of this patent is extended or adjusted under 35 U.S.C. 154(b) by 468 days.

(21) Appl. No.: 10/760,944

(22) Filed: Jan. 20, 2004

(65) Prior Publication Data

US 2005/0159132 A1 Jul. 21, 2005

(51) Int. Cl.
*H04L 29/06* (2006.01)
*H04M 11/04* (2006.01)
*G01W 1/00* (2006.01)
*G08B 5/22* (2006.01)
*H04Q 1/30* (2006.01)

(52) U.S. Cl. .................. 455/414.3; 455/404.1; 340/601; 340/7.48

(58) Field of Classification Search ............... 455/404.1, 455/414.3; 340/601, 7.48
See application file for complete search history.

(56) References Cited

U.S. PATENT DOCUMENTS

| | | | | |
|---|---|---|---|---|
| 5,444,433 | A * | 8/1995 | Gropper | 340/601 |
| 6,177,873 | B1 * | 1/2001 | Cragun | 340/601 |
| 6,710,715 | B2 * | 3/2004 | Deeds | 340/601 |
| 6,728,522 | B1 * | 4/2004 | Marrah et al. | 455/179.1 |
| 6,850,604 | B2 * | 2/2005 | Cannell et al. | 379/93.01 |
| 6,973,336 | B2 * | 12/2005 | Heie | 455/574 |
| 7,003,304 | B1 * | 2/2006 | Helferich | 455/458 |
| 7,053,780 | B1 * | 5/2006 | Straub et al. | 340/601 |
| 7,194,249 | B2 * | 3/2007 | Phillips et al. | 455/404.1 |
| 2004/0080430 | A1 * | 4/2004 | Videtich | 340/905 |

OTHER PUBLICATIONS

Brown, B., "Wireless Internet-Based Remote Control Using a Pager Interface," Newsletter, IEEE Consultants' Network of Connecticut, Sep. 1, 2001.
"EMCOM National Emergency Alert Notification System," available at http://www.comdinet.com/emcom/index1.html, copyright 1998-2003.
"National Weather Service, NOAA Weather Radio (NWR) Transmitters," update #4.43, available at http://205.156.54.206/nwr/nwrsame.htm, Jul. 13, 1999.
"NOAA Weather Radio: A Lifesaver for the Cost of a Pair of Shoes," available at http://govinfo.library.unt.edu/accessamerica/docs/noaaradio.html, May 10, 1999.
"Selecting a Weather Radio Receiver," available at http://www.pioneer.com/media/weather_radio/radio_choose.htm, copyright 1996-2004.

(Continued)

*Primary Examiner* — Marivelisse Santiago-Cordero
(74) *Attorney, Agent, or Firm* — Woodcock Washburn LLP (57) ABSTRACT

A telecommunications device for use by a telecommunications user is disclosed. The telecommunications device includes a housing having located therein a wireless telephone for receiving an incoming call and a receiver unit for receiving an emergency alert broadcast. The wireless telephone includes a first receiver and a processor in communication therewith, and the receiver unit includes a second receiver in communication with the processor of the wireless telephone.

21 Claims, 3 Drawing Sheets

OTHER PUBLICATIONS

"Weather Alert 2000," available at http://www.weathermatrix.net/merchandise/wa2k.shtml, copyright 1996-2003.

Weigel, R., "Review: Weather Alert 2000," available at http://www.techtv.com/products/consumerelectronics/story/0.23008.3358065.00.html, Nov. 2, 2001.

"Windbond Launches Industry's First Single-Chip Text-To-Speech Solution," available at http://www.winbond-usa.com/news/pressrel/11-01-2001.shtml, Nov. 1, 2001.

"WX-1000 Weather Receiver with Same Technology," available at http://www.catauto.com/wx1000.html, copyright 2003-2004.

* cited by examiner

WIRELESS DEVICE WITH INTEGRATED EMERGENCY ALERT NOTIFICATION

TECHNICAL FIELD

The present invention is directed generally and in various embodiments to a telecommunications device, and more particularly, to a telecommunications device comprising a wireless telephone having an emergency alert receiver communicatively integrated therewith for providing an emergency alert notification.

BACKGROUND

Weather radio receivers for use with the National Oceanic and Atmospheric Administration Weather Radio (NWR) service are widely available and incorporate various features according to cost and manufacturer. The most basic receiver feature consists of providing an emergency alert notification in response to a NWR broadcast describing an event that threatens life or property.

The National Weather Service (NWS) uses an NWR-Specific Area Message Encoding (NWR-SAME) scheme. By placing encoded information at the beginning and end of each emergency broadcast, the NWR-SAME scheme permits greater control of transmitters, receivers, and other broadcasting equipment within a specific geographic region. The encoded information is transmitted on NWR radio channels using audio frequency shift keying (AFSK) and contains information describing the emergency and the NWR-SAME emergency alert broadcast. Aspects of this information may include, for example, the emergency type, the geographic area affected, the expected duration of time for which the information contained in the emergency alert broadcast is valid, the date and time of the broadcast, and the identify of the broadcast originator. A weather radio receiver capable of interpreting this information may be programmed to provide an emergency alert notification in response to receiving a NWR-SAME broadcast only if user-defined emergency alert preferences such as, for example, the emergency type and the geographic area affected, are satisfied.

SUMMARY

This application discloses a telecommunications device for use by a telecommunications user. According to various embodiments, the device includes a housing having located therein a wireless telephone for receiving an incoming call and a receiver unit for receiving an emergency alert broadcast. The wireless telephone includes a first receiver and a processor in communication therewith, and the receiver unit includes a second receiver in communication with the processor of the wireless telephone.

This application further discloses a method of providing an emergency alert notification to a user of a telecommunications device in response to receiving an emergency alert broadcast. According to various embodiments, the telecommunications device includes a housing having located therein a wireless telephone for receiving an incoming call and a receiver unit in communication with the wireless telephone for receiving an emergency alert broadcast. According to various embodiments, the method includes receiving an emergency alert broadcast from an emergency alert transmitter via the receiver unit, extracting coded information contained in the emergency alert broadcast, and providing an emergency alert notification to the user of the telecommunications device based upon the extracted coded information.

Other devices and/or methods according to embodiments will be or become apparent to one with skill in the art upon review of the following drawings and detailed description. It is intended that all such devices and/or methods be included within this description, be within the scope of the present invention, and be protected by the accompanying claims.

BRIEF DESCRIPTION OF THE FIGURES

The present disclosure will be described in conjunction with the following figures, wherein.

DETAILED DESCRIPTION

It is to be understood that the figures and descriptions of the present invention have been simplified to illustrate elements that are relevant for a clear understanding of the present invention, while eliminating, for purposes of clarity, other elements of a conventional telecommunications device. For example, certain elements of a wireless telephone and the functions served by those components are not described herein. Those of ordinary skill in the art will recognize, however, that these and other elements may be desirable in a wireless telephone. However, because such elements are well known in the art, and because they do not facilitate a better understanding of the present invention, a discussion of such elements is not provided herein.

The term "calling party" is used herein generally to refer to the person or unit that initiates a telecommunication. The calling party may also be referred to herein as "caller." In some cases, the calling party may not be a person, but may be a device such as a facsimile machine, an answering service, a modem, etc. The terms "called party" and "user" are used herein generally to refer to the person or unit that answers or responds to the call or communication. The term "communication" is used herein to include all messages or calls that may be exchanged between a calling party and a called party, including voice, data and video messages. The term "communication" is used synonymously herein with the term "call" unless a distinction is noted. The term "alert recipient" is used herein generally to refer to the recipient of an emergency alert notification. The term "emergency alert notification" is used herein to include any physical, auditory, or visual signal or information provided to an alert recipient in response to receiving an emergency alert broadcast. The alert recipient may also be a calling party if an emergency alert broadcast is received while the alert recipient is engaged in a telecommunication initiated by the alert recipient. Alternatively, the alert recipient may also be a called party if an emergency alert broadcast is received while the alert recipient is engaged in a telecommunication not initiated by the alert recipient.

The present invention in various embodiments permits a user of a wireless device, such as a wireless telephone, by virtue of an emergency alert receiver communicatively integrated therewith, to be notified of an emergency alert broadcast that satisfies user-defined emergency alert preferences. If the wireless telephone is activated (i.e., turned on) but not being used to conduct a call, the receipt of an emergency alert broadcast may notify the alert recipient of the nature of the emergency via one or more interface resources associated with the wireless telephone. Thereafter, appropriate safety measures may be taken in accordance with pre-stored information contained in the telecommunications device 10 and provided to the alert recipient. If the wireless telephone is deactivated and thus incapable of receiving incoming calls (i.e., turned off), the receipt of an emergency alert broadcast may also serve to automatically activate one or more interface resources of the wireless telephone so that information relating to the nature of the emergency may be communicated to the alert recipient.

Alternatively, if the wireless telephone is being used to conduct a call when an emergency alert broadcast is received, the alert recipient may be notified of the existence of the emergency and given the option to terminate or temporarily suspend the call in order to make available the necessary interface resources for communicating information regarding the nature of the emergency.

Figure 1:
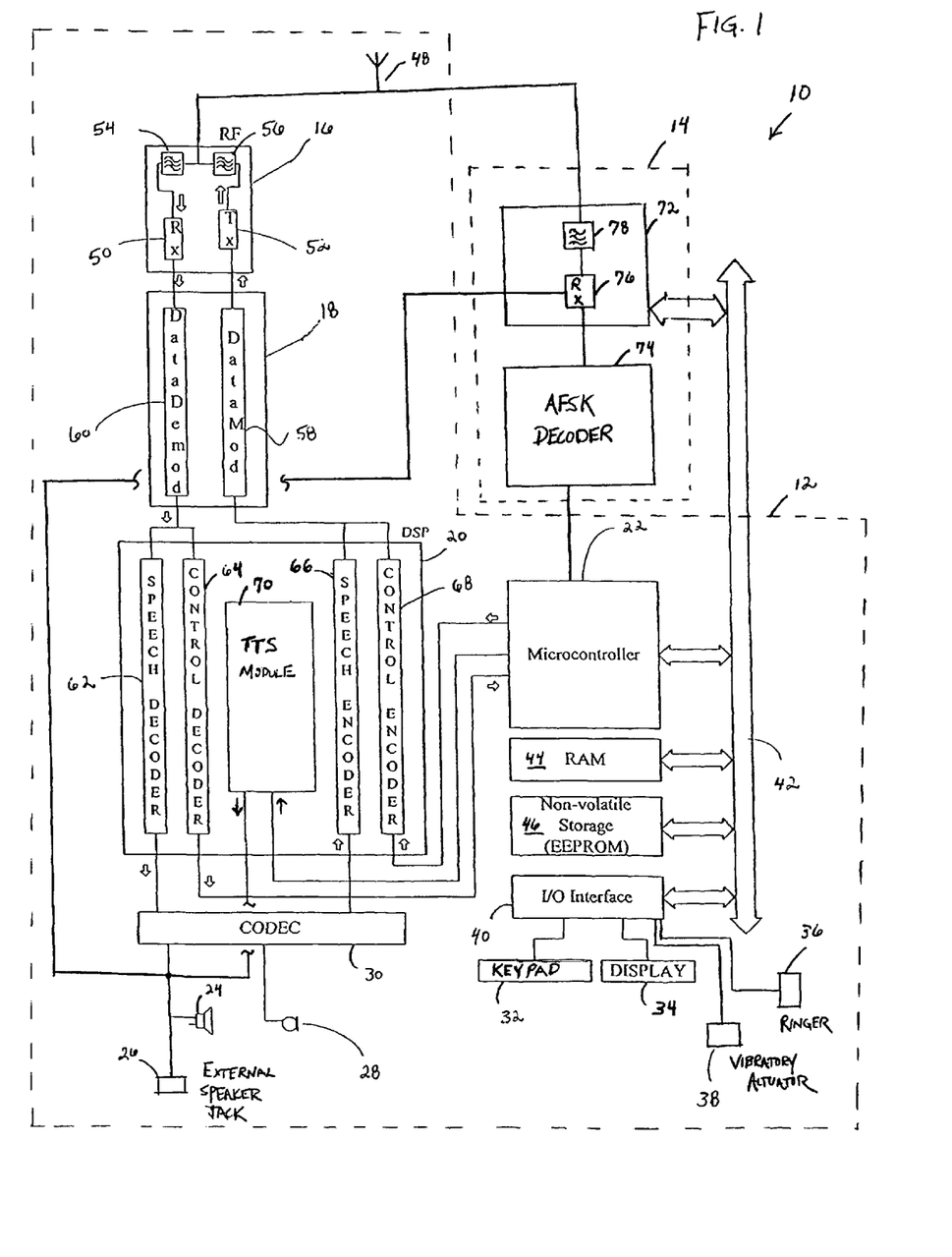
FIG. 1 illustrates a telecommunications device according to various embodiments of the present invention.

FIG. 1 is a block diagram of a telecommunications device 10 according to various embodiments of the present invention. As shown in FIG. 1, the telecommunications device 10 is comprised of a wireless telephone 12 for receiving an incoming call in communication with a receiver unit 14 for receiving an emergency alert broadcast from an emergency alert transmitter (not shown). The wireless telephone 12 may be, for example, a digital wireless telephone (DWT) that can function in a digital wireless communication system (e.g., a TDMA system or a CDMA system). The wireless telephone 12 and the receiver unit 14 are physically located within a common housing (not shown) that resembles a conventional wireless telephone.

The wireless telephone 12 illustrated in FIG. 1 includes a RF transceiver unit 16, a modulator-demodulator unit 18, a digital signal processor (DSP) 20, and a microcontroller 22. The wireless telephone 12 also includes a speaker 24, an external speaker jack 26, and a microphone 28 connected to the DSP 20 via a CODEC (coder-decoder) unit 30. Additionally, the wireless telephone includes a keypad 32, a display unit 34, a ringer 36 and/or a vibratory actuator 38. The keypad 32 and the display unit 34 interface with the microcontroller 22 via an I/O interface 40. The I/O interface 40 communicates with the microcontroller 22 via a bi-directional bus 42. Collectively, the speaker 24, external speaker jack 26, microphone 28, keypad 32, display unit 34, ringer 36 and vibratory actuator 38 comprise the interface resources of the wireless telephone 12. The wireless telephone 12 also includes memory units such as, for example, a RAM unit 44 and a non-volatile memory unit 46. The memory units 44, 46 are in communication with the microcontroller 22 via the bidirectional data bus 42. The non-volatile memory unit 46 may be, for example, an EEPROM. According to other embodiments, the wireless telephone 12 may include other types of memory units such as, for example, a ROM or a flash memory.

The RF transceiver unit 16 includes a RF antenna 48 that is shared with the receiver unit 14 as discussed hereinbelow, a RF receiver amplifier 50, and a RF transmitter amplifier 52. The RF transceiver unit 16 also includes a pair of band pass filters, a receiver filter 54 and a transmitter filter 56, to filter out signals outside of the receive and transmit frequency ranges, respectively. The RF transceiver unit 16 establishes a telephone communication over one or more RF channels.

The modulator-demodulator unit 18 includes a data modulator 58 and a data demodulator 60. The data demodulator 60 demodulates voice and control channel bits received by the RF transceiver unit 16, as described further hereinbelow. The data modulator 58 modulates voice and control channel bits to be transmitted by the RF transceiver unit 16, as discussed further hereinbelow.

The microcontroller 22 may include a number of logic units or circuit elements (not shown) such as a bus control logic unit and a control information processing unit, as well as one or more temporary storage registers or buffers. Among other things, the microcontroller 22 interprets keypad entries entered on the keypad 32 and received via the I/O interface 40. Further, the microcontroller 22 controls the display of information on the display unit 34 via the I/O interface 40.

The DSP 20 includes a number of modules, such as a speech decoder module 62, a control decoder module 64, a speech encoder module 66, a control encoder module 68, and a text-to-speech (TTS) module 70. The modules 62, 64, 66, 68, 70 are implemented using any type of computer instruction type, such as microcode, that is stored in, for example, one of the memory units 44, 46 or configured into the logic of the DSP 20.

The decoder units, i.e., the speech decoder module 62 and the control decoder module 64, receive demodulated bit streams from the data demodulator 60. The speech decoder module 62 supplies its output to the CODEC unit 30, and the control decoder module 64 supplies its output to the microcontroller 22 for further processing. The encoder units, i.e., the speech encoder module 66 and the control encoder module 68 supply their respective outputs to the data modulator unit 58. The speech encoder module 66 receives encoded speech from the CODEC unit 30, and the control encoder unit 68 receives transmit control information from the microcontroller 22.

The TTS module 70 receives text output from the microcontroller 22 for conversion into an analog audio signal that can be fed directly to the speaker 24 or to the external speaker jack 26. Alternatively, the TTS module 70 may produce a digital audio signal that can be output to the CODEC 30 for conversion into an analog audio signal. The TTS module 70 may be, for example, a WTS701 integrated circuit manufactured by Windond Electronics Corp. that converts ASCII input into human speech by concatenating pre-stored speech samples.

The wireless telephone 12 enters into a conversation mode when a voice channel is assigned to it by a base station of a wireless network (not shown). The analog speech signal from the microphone 28 is first converted into a digital format, e.g., a PCM (pulse code modulation) format, by the CODEC unit 30. The speech encoder module 66 of the DSP 20 then divides the digital output from the CODEC unit 30 into appropriate time slots and then encode each group of bits. The encoding by the speech encoder 66 also compresses the size of each group of data bits. The DSP 20 encodes via the control encoder 68 any control channel information (including any DTMF audio signaling tones to be transmitted over the digital voice channel) received from the microcontroller 22, and adds the encoded control bits to the appropriate group of encoded data bits from the speech encoder 66. The DSP 20 (for example, through the speech encoder module 66) also adds error protection to some of the voice data bits. The combined digital control and voice data bits are then modulated by the data modulator 58. According to one embodiment, the data modulator 58 is a differential quadrature phase shift keying (DQPSK) modulator. The modulated digital voice and control channel bits are then transmitted via the RF transceiver unit 16 after amplification by the RF transmitter amplifier 52 and filtering by the transmitter filter 56.

Digital voice and control channel information received by the RF antenna 48 is first filtered by the receiver filter 54 and amplified by the RF receiver amplifier 50. Thereafter, the data demodulator 60 of the modulator-demodulator unit 18 demodulates the received voice and control channel bits using, for example, DQPSK demodulation. The DSP 20 receives the demodulated digital voice and control channel bits from the data demodulator 60 and removes the encoding present therein with the speech decoder module 62 and the control decoder module 64 respectively. The decoded control bits are sent to the microcontroller 22 for further processing. However, the decoded voice bits are sent to the CODEC unit 30 to reconstruct the analog audio information received through the digital voice bits. The user of the wireless telephone 12 may then listen to the received audio through the speaker 24.

Because many of the components of a typical weather radio receiver may duplicate functions performed by the wireless telephone 12, it may be advantageous to reduce functional redundancy by integrating components that serve common needs. Accordingly, as shown in FIG. 1, the microcontroller 22 of the wireless telephone 12 is in communication with the receiver unit 14, thereby providing a common processor resource for the telecommunications device 10. It may nonetheless be necessary for the receiver unit 14 to retain some low-level processing resources for communication purposes and for performing processing tasks not otherwise provided by the microcontroller 22. The receiver unit 14 also communicates with the microcontroller 22, as well as with the memory units 44, 46 and the interface resources 32, 34, 36, 38 via the bi-directional bus 42. In order to further reduce functional redundancy, the wireless telephone 12 and receiver unit 14 are powered from a common source, such as, for example, a rechargeable nickel-cadmium battery (not shown).

In various embodiments, the receiver unit 14 may include components similar to those found in a weather radio receiver having Specific Area Message Encoding (SAME) capabilities. The receiver unit 14 includes, for example, a NWR weather receiver 72 in communication with an audio frequency shift keying (AFSK) demodulator 74. The NWR receiver 72 includes a RF receiver amplifier 76 and a tunable receiver filter 78 for selectively receiving any one of the seven NWR channels. The NWR receiver 72 also includes channel-scanning circuitry (not shown) for continuously monitoring all seven NWR channels and automatically selecting a channel on which an emergency alert broadcast is being transmitted. Emergency alert broadcasts are received by the NWR receiver 72 via the RF antenna 48 that is shared with the RF transceiver unit 16 of the wireless telephone 12. Alternatively, the NWR receiver 72 may receive emergency alert broadcasts from a dedicated antenna (not shown) that is separate from the wireless telephone 12.

In various embodiments, the NWR receiver 72 is also be configured to receive standard AM or FM radio broadcasts via the RF antenna 48 within the frequency bands of 530-1710 Khz and 88-108 Mhz respectively. These broadcasts are communicated from the NWR receiver 72 directly to the speaker 24 of the wireless telephone 12 or to an external speaker (not shown) via the external speaker jack 26. As discussed above, the NWR receiver 72 is in communication with the microcontroller 22 and the interface resources via the bi-directional bus 42. Accordingly, various aspects of the AM/FM radio feature of the NWR receiver 72, such as, for example, the received frequency band and the received frequency within that band, are stored, displayed, and changed using the keypad 32 and display unit 34. In the event that the AM/FM radio feature is in use when an emergency alert broadcast is received, the microcontroller 22 automatically deactivates the AM/FM radio feature so that information relating to the nature of the emergency may be communicated to the alert recipient.

A NWR-SAME emergency alert broadcast received by the NWR receiver 72 is generally comprised of two separate information components—an encoded component and an analog audio component. Broadcast prior to the analog audio component using audio frequency shift keying (ASFK) on the audio channel of a NWR frequency, the encoded component includes a series of ASCII "header code" blocks that contain information describing the particular emergency. Aspects of this information may include, for example, the type of emergency (e.g., a tornado warning), the geographic area affected (e.g., Allegheny County, Pennsylvania), the expected time duration for which the information contained in the emergency alert broadcast is valid, the time and date of the broadcast, and the identity of the broadcast originator. This information is represented in a compact format using a standardized NWR-SAME transmission protocol adopted by the NWS. The encoded information may be typically transmitted three times in a consecutive fashion with a short delay between each transmission. Upon receipt of the encoded component by the NWR receiver 72, the information contained in each header code block is extracted by the AFSK demodulator 74 and communicated to the microcontroller 22 for additional processing, as discussed further hereinbelow.

If included with the NWR-SAME emergency alert broadcast, the analog audio component resembles a conventional NWR emergency alert broadcast and consists of an 8-10 second warning alarm tone (WAT) broadcast at a frequency of 1050 Hz, followed by a recorded voice message repeating information contained in the header code blocks and providing additional information in a traditional weather report format. This portion of the NWR-SAME emergency alert broadcast is communicated from the RF receiver amplifier 76 directly to the speaker 24 of the wireless telephone 12 or to an external speaker (not shown) via the external speaker jack 26.

Figure 2:
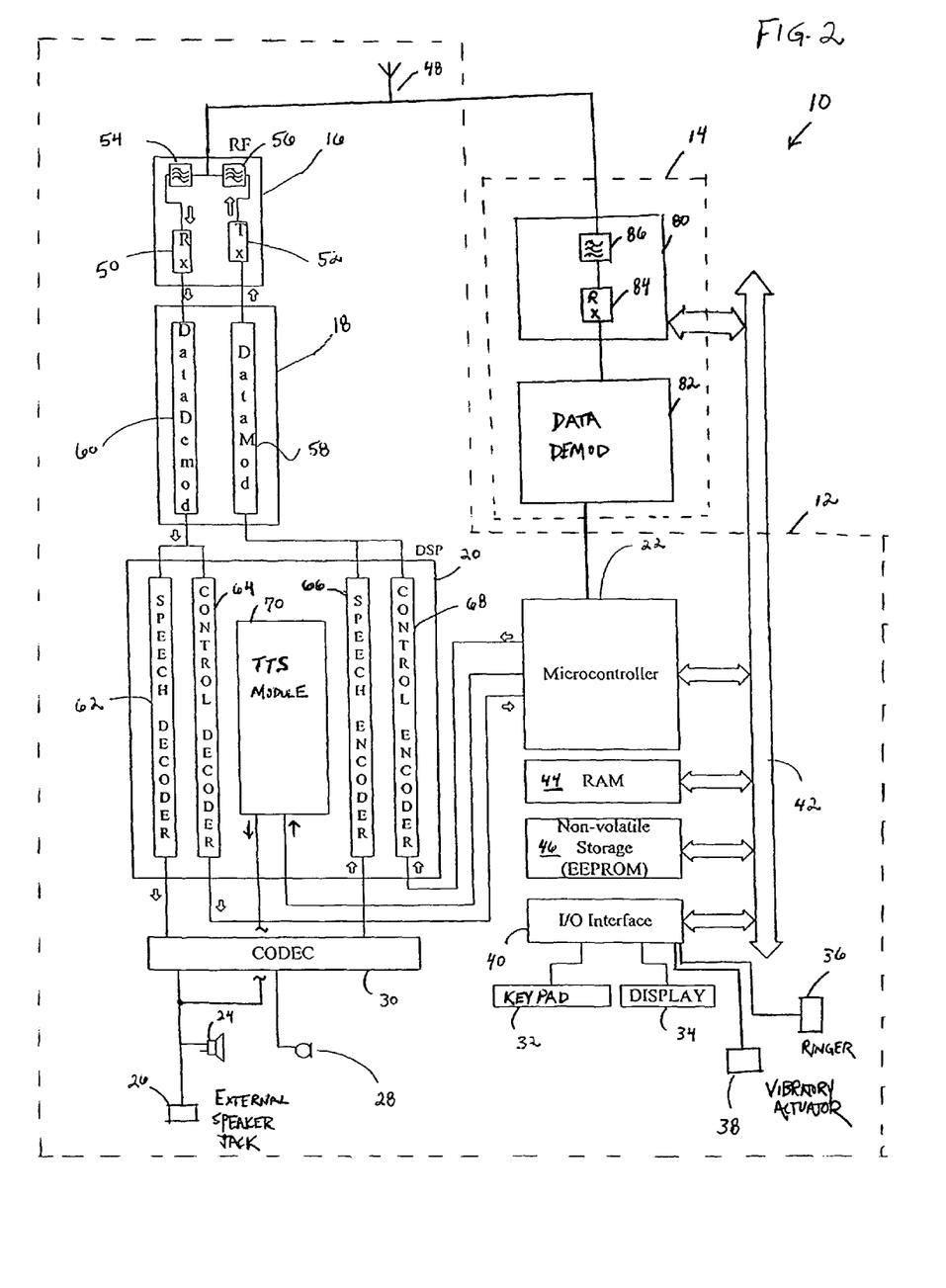
FIG. 2 illustrates a telecommunications device according to various embodiments of the present invention.

FIG. 2 is a block diagram of the telecommunications device 10 according other embodiments of the present invention wherein the receiver unit 14 includes a digital receiver 80 configured to receive a digital emergency alert broadcast such as, for example, a satellite digital emergency alert broadcast available from a subscription-based emergency and severe weather notification service. Like the RF transceiver unit 16 of the wireless telephone 12, the digital receiver 80 includes a band pass filter 86 for filtering signals outside of the desired frequency range and a receiver amplifier 84 for amplifying the filtered output of the band pass filter 86. The receiver unit 14 also includes a data demodulator 82 for demodulating the digital receiver 80 output in a manner similar to that of the data demodulator 60 described above in conjunction with FIG. 1. In various embodiments, the receiver unit 14 of FIG. 2 may be, for example, a CreataLink FLX receiver available from Motorola, Inc. of Chicago, Ill. for receiving 900 MHz digital satellite broadcasts using the FLEX communication protocol. The digital emergency alert broadcasts may be provided by a notification service such as, for example, PageUpdate, Inc. of Nashville, Tenn.

Digital emergency alert broadcasts are received by the digital receiver 80 via the RF antenna 48 that also supplies signals to the RF transceiver unit 16 of the wireless telephone 12. Alternatively, the digital receiver 80 may receive digital emergency alert transmissions using a dedicated antenna (not shown) that is separate from the wireless telephone 12. For example, the receiver unit 14 may include an onboard antenna such as that provided with the CreataLink FLX receiver described above.

Unlike the NWR-SAME emergency alert broadcast described above in conjunction with FIG. 1, all information contained in the digital emergency alert transmission is encoded and must be demodulated from the received signal via the data demodulator 82. The substance of this information, however, closely resembles that contained in the encoded and analog audio information components of an NWR-SAME emergency alert broadcast, as described above in connection with FIG. 1

Figure 3:
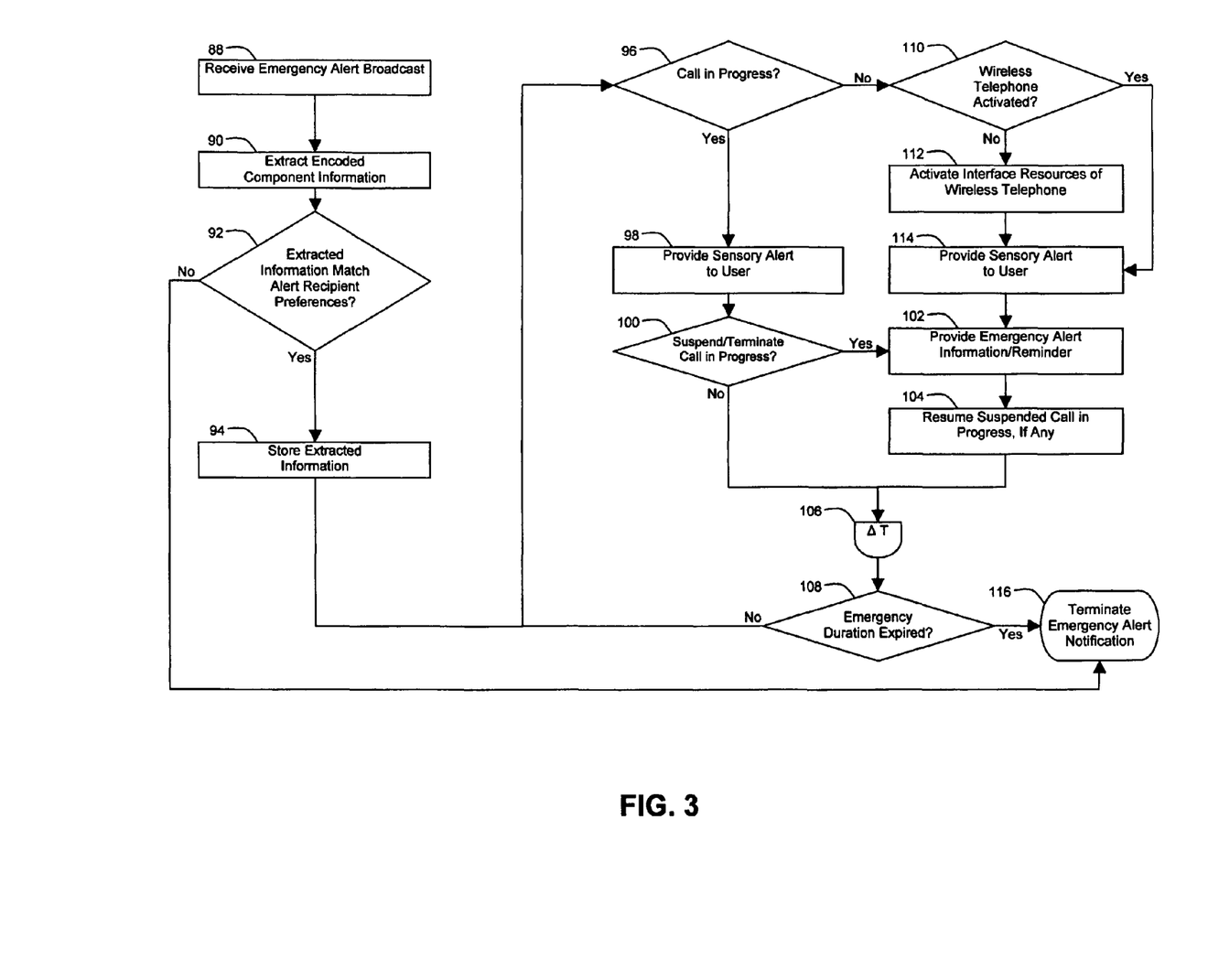
FIG. 3 illustrates a flow through various embodiments of the telecommunications devices as shown in FIGS. 1 and 2.

FIG. 3 illustrates a flow through various embodiments of the telecommunications device 10 as shown in FIGS. 1 and 2. At step 88, an emergency alert broadcast is received by the telecommunications device 10. The emergency alert broadcast may be, for example, a NWR-SAME emergency alert broadcast received by the NWR receiver 72 or a digital emergency alert broadcast received by the digital receiver 80, as discussed above in connection with FIGS. 1 and 2 respectively. One or more settings associated with the telecommunications device 10 such as, for example, activation/deactivation of the emergency alert notification feature, the frequency to be received by the receiver unit 14, and volume of the ringer 36, are entered, recalled, displayed, or modified using the keypad 32 and display unit 34 of the wireless telephone 12.

At step 90, encoded information contained in the received emergency alert broadcast is extracted and communicated to the microcontroller 22. As discussed above with respect to FIG. 1, encoded information contained in the ASCII header code blocks of an NWR-SAME emergency alert broadcast are extracted using the AFSK demodulator 74 of the receiver unit 14. The extracted information is formatted as a series of ASCII strings. One of the ASCII strings may be, for example, "TOW," corresponding to the NWR-SAME event code for a tornado warning. If the emergency alert broadcast is digitally encoded, as described above in connection with FIG. 2, encoded information is extracted by demodulating the digital receiver 80 output and provided to the microcontroller 22 in a format such as, for example, FLEXStack data packets.

Thereafter, the microcontroller 22 executes one or more instructions at step 92 whereby one or more pieces of the extracted information is compared to predetermined emergency alert preferences. Programmed by the alert recipient using the keypad 32 and display unit 34 and stored in one the memory units 44, 46, the emergency alert preferences may specify, for example, that the alert recipient wishes to be notified of only a limited set of emergency types (e.g., severe thunderstorm watches and flash flood watches) that threaten a particular geographic region (e.g., Allegheny and Washington Counties in Pennsylvania). If determined by the microcontroller 22 that the extracted information matches the predetermined emergency alert preferences, the extracted information is automatically stored in one of the memory units 44, 46 at step 94 for subsequent processing and future retrieval by the alert recipient. If the extracted information does not match the predetermined emergency alert preferences, the emergency alert notification process is terminated at step 116.

If the extracted information matches the predetermined emergency alert preferences, the microcontroller 22 next determines at step 96 if the wireless telephone is currently being used by the alert recipient to conduct a call. If a call is currently in progress, the microcontroller 22 executes one or more instructions at step 98 for providing a sensory alert that informs the alert recipient of the existence of an emergency. For example, the instructions executed by the microcontroller 22 at step 98 cause the microcontroller 22 to output to the TTS module 70 an ASCII string such as, for example, "You have received an emergency alert; in order to receive further information please press '8' to suspend your call or '9' to terminate your call." The TTS module 70 then converts the ASCII string into a corresponding analog audio signal that is communicated to the alert recipient via the speaker 24. Alternatively, the instructions executed by the microcontroller 22 at step 98 may cause the microcontroller to activate the vibratory actuator 38 and/or the ringer 36 and simultaneously display a text message similar to the ASCII string described above via the display unit 34.

At step 100, the alert recipient chooses whether to temporarily suspend or terminate the current call in order to receive further information contained in the emergency alert broadcast. If the alert recipient chooses to temporarily suspend or terminate the call, the extracted information previously stored at step 94 is recalled from the appropriate memory unit 44, 46 and provided to the alert recipient at step 102. For example, the extracted information is processed by the microcontroller 22 into a text-formatted emergency alert message that is communicated to the alert recipient via the display unit 34. Alternatively, the microcontroller 22 outputs the text-formatted emergency alert message to the TTS module 70 for conversion into an analog audio signal that is communicated to the alert recipient via the speaker 24. If the emergency alert broadcast is a NWR-SAME emergency alert broadcast containing an analog audio component, the voice message contained therein is output from the receiver amplifier 76 to the speaker 24, as described above in connection with FIG. 1.

In addition to the information contained in the emergency alert broadcast, pre-stored information relating to the particular type of emergency is also provided to the alert recipient. For example, if the emergency alert broadcast indicates that a tornado warning has been issued, the alert recipient is automatically provided information previously stored in one of the memory units 44, 46, via the display unit 34 that provides a recommended course of action for dealing with a tornado emergency. Alternatively, this information may be manually accessed by the alert recipient using the keypad 32 and display unit 34.

Upon receiving and reviewing the emergency alert information at step 102, the alert recipient may choose to resume a suspended call in progress at step 104.

If at step 96 the microcontroller 22 determines that there is no call currently in progress, the microcontroller 22 next determines at step 110 if the wireless telephone 12 is currently activated. The alert recipient, for example, may not wish to receive calls and may have temporarily deactivated the wireless telephone as a result. If determined that the wireless telephone 12 is deactivated, the microcontroller 22 executes one or more instructions at step 112 to activate the necessary interface resources 24, 26, 32, 34, 36, 38 for providing a sensory alert at step 114 and emergency alert information at step 102. If the microcontroller 22 determines that the wireless telephone 12 is activated, step 112 is bypassed and the emergency alert notification process proceeds from step 110 to step 114.

At step 114, a sensory alert is provided to the alert recipient in a manner similar to that described above in connection with step 98. Prior to providing the sensory alert, it may first be necessary for the microcontroller 22 to deactivate other features of the telecommunications device 10 that are currently in use, such as, for example, the AM/FM radio feature. Thereafter, the information contained in the emergency alert broadcast is provided to the alert recipient at step 102, along with pre-stored information relating to the particular type of emergency, as discussed above.

After the alert recipient has received and reviewed the emergency information at step 102, or if the alert recipient has declined to suspend or terminate a call in progress at step 100, a reminder of the emergency alert broadcast is periodically generated and provided to the alert recipient at a predetermined time interval specified by step 106. The desired time interval between reminders at step 106 is entered by the alert recipient using the keypad 32 and display unit 34 and stored in one of the memory units 44, 46. At step 108, upon the expiration of the time interval specified by step 106, the microcontroller 22 executes one or more instructions for comparing the current time and date to the expiration time and date of the emergency. The expiration time and date of the emergency is determined by the microcontroller 22 using the encoded information extracted from the emergency alert broadcast and stored at steps 90 and 94 respectively. For example, the expiration time and date of the emergency is computed by adding the expected time duration for which the information contained in the emergency alert broadcast is valid to the time and date that the broadcast was issued. If the expiration time and date of the emergency is later than the current time and date, the emergency alert notification process is repeated beginning at step 96. Because the reminder provided to the alert recipient at step 102 is based only upon information stored at step 94, the analog audio component of an NWR-SAME emergency alert broadcast is not included in the reminder. The reminder is continually provided to the alert recipient until it is determined at step 108 that the current time and date is later than the expiration time and date of the emergency, in which case the emergency alert notification process is terminated at step 116.

Whereas particular embodiments of the invention have been described herein for the purpose of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. The preceding description, therefore, is not meant to limit the scope of the invention.

What is claimed is:

1. A wireless device for receiving an incoming call, the wireless device comprising:
    a first receiver configured to receive telephone calls;
    a second receiver, different than the first receiver, the second receiver configured to receive an emergency alert broadcast; and
    a microcontroller in communication with the first and second receivers, the microcontroller configured to be a common processor resource for the first and second receivers of the wireless device, by:
        determining whether an emergency alert broadcast is being received at the second receiver,
        determining whether to provide a notification of the emergency alert broadcast based on user-defined emergency alert preferences, the user-defined emergency alert preferences comprising one or more emergency alert types,
        storing code information received from the emergency alert broadcast,
        presenting an option to suspend a call in progress;
        providing a periodic reminder of the emergency alert broadcast upon receipt of a first manual selection to decline to suspend the call in progress, the periodic reminder comprising information regarding an emergency associated with the emergency alert broadcast, the periodic reminder being continually provided at a predetermined time interval until an expiration date and time of the emergency, and the predetermined time interval comprising a user-specified time interval between reminders of the emergency alert; and
        suspending the call in progress and providing the emergency alert notification based on the coded information upon receipt of a second manual selection to suspend the call in progress.

2. The device of claim 1, wherein the microcontroller is further configured to resume the suspended call in progress upon receipt of a third manual selection to resume the suspended call.

3. The device of claim 1, wherein the first receiver includes a RF transceiver unit.

4. The device of claim 1, wherein the second receiver includes a National Oceanic and Atmospheric Administration Weather Radio weather receiver configured to receive National Oceanic and Atmospheric Administration Weather Radio-specific Area Message Encoding emergency alert broadcasts.

5. The device of claim 4, wherein the National Oceanic and Atmospheric Administration Weather Radio weather receiver is further configured to receive standard frequency modulated (FM) and amplitude modulation (AM) broadcasts.

6. The device of claim 1, wherein the second receiver includes a digital receiver.

7. The device of claim 1 further comprising a digital signal processor.

8. The device of claim 1, wherein the receiver unit includes a first processing module for extracting the code information included in the emergency alert broadcast and the periodic reminder includes an emergency alert message containing at least a portion of the code information.

9. The device of claim 8, wherein the emergency alert message comprises an audible emergency alert message, a visual emergency alert message, or an audiovisual emergency alert message.

10. The device of claim 1, wherein the microcontroller is further configured to determine the expiration date and time of the emergency by adding an expected time duration for which the emergency alert broadcast is valid to an issuance date and time of the emergency alert broadcast.

11. The device of claim 1, wherein the microcontroller is further configured to provide a sensory alert associated with the emergency alert broadcast.

12. The device of claim 1, wherein the microcontroller is further configured to provide a sensory alert associated with the emergency alert broadcast, the sensory alert comprising an option to suspend a call in progress and an option to terminate a call in progress.

13. A wireless telephone, comprising:
    a weather alert radio which includes a receiver configured to communicate with a National Oceanic and Atmospheric Administration radio broadcast system or a digital satellite system;
    a digital AM/FM radio module in communication with the weather alert radio;
    an alerting module in communication with the weather alert radio and the wireless telephone, configured to provide an audio, a visual or an audio-visual alert, wherein the magnitude and type of the alert is selectably modulateable;
    a speaker jack, coupled to the weather alert radio, the digital AM/FM radio module and the wireless telephone;
    a power module, including a battery power pack coupled to the wireless telephone, weather alert radio, AM/FM radio module, and alerting module;
    a user interface, having a key pad, wherein the key pad is in communication with the weather alert radio, the digital AM/FM radio module and the wireless telephone;

an antenna, coupled to the wireless telephone, in communication with the wireless telephone and the weather alert radio; and a microcontroller configured to:

determine whether to provide a notification of an National Oceanic and Atmospheric Administration alert broadcast based on user-defined emergency alert preferences, wherein the user-defined emergency alert preferences comprise one or more emergency alert types;

provide an option to suspend a call in progress;

provide a periodic reminder of an emergency alert broadcast upon receipt of a first manual selection to decline to the call in progress, the periodic reminder comprising information regarding a weather emergency associated with the emergency alert broadcast to the user of the wireless telephone, the periodic reminder being continually provided at a predetermined time interval until an expiration date and time of the weather emergency, and the predetermined time interval comprising a user-specified time interval between reminders of the emergency alert; and     suspend the call in progress and provide the notification upon receipt of a second manual selection to suspend the call in progress.

14. A method comprising:

activating a digital AM/FM radio module of a wireless telephone;

receiving a weather alert broadcast at the wireless telephone;

determining whether to provide a notification of the weather alert broadcast based on user-defined emergency alert preferences, wherein the user-defined emergency alert preferences comprise one or more emergency alert types a user wishes to be notified of;

automatically deactivating the digital AM/FM radio module of the wireless telephone upon receipt of the weather alert broadcast;

providing an option to suspend a call in progress;

providing a reminder associated with the weather alert broadcast via an audio, visual, or audio visual alert upon receipt of a first manual selection to decline to suspend the call in progress, wherein the reminder associated with the weather alert broadcast is provided periodically at a predetermined time interval, and wherein the predetermined time interval comprises a user-specified time interval between reminders of the emergency alert; and providing information associated with the weather alert broadcast upon receipt of a second manual selection to suspend the call in progress.

15. The method of claim 14, wherein receiving the weather alert broadcast includes extracting coded information from the weather alert broadcast.

16. The method of claim 15, further comprising providing a recommended course of action based upon the extracted coded information, wherein a recommended course of action includes information regarding steps for managing a situation in a specific weather emergency.

17. The method of claim 14, wherein receiving the weather alert broadcast includes comparing the coded information to predetermined information stored in the wireless telephone.

18. The method of claim 14, wherein providing the information associated with the weather alert broadcast comprises providing an emergency alert message, the emergency alert message comprising at least a portion of the coded information.

19. The method of claim 14, further comprising:

if a wireless telephone call is not in progress, determining if the wireless telephone is activated; and     if the wireless telephone is not activated, activating one or more interface resources of the wireless telephone, wherein the one or more interface resources include a speaker, a microphone, a keypad, a display, a ringer, and a vibratory actuator.

20. The method of claim 19, wherein if the wireless telephone is activated, the information associated with the weather alert broadcast is provided.

21. The method of claim 14, wherein providing the information associated with the weather alert broadcast includes providing the information simultaneously with a call in progress.

* * * * *